United States Patent Office 3,399,531
Patented Sept. 3, 1968

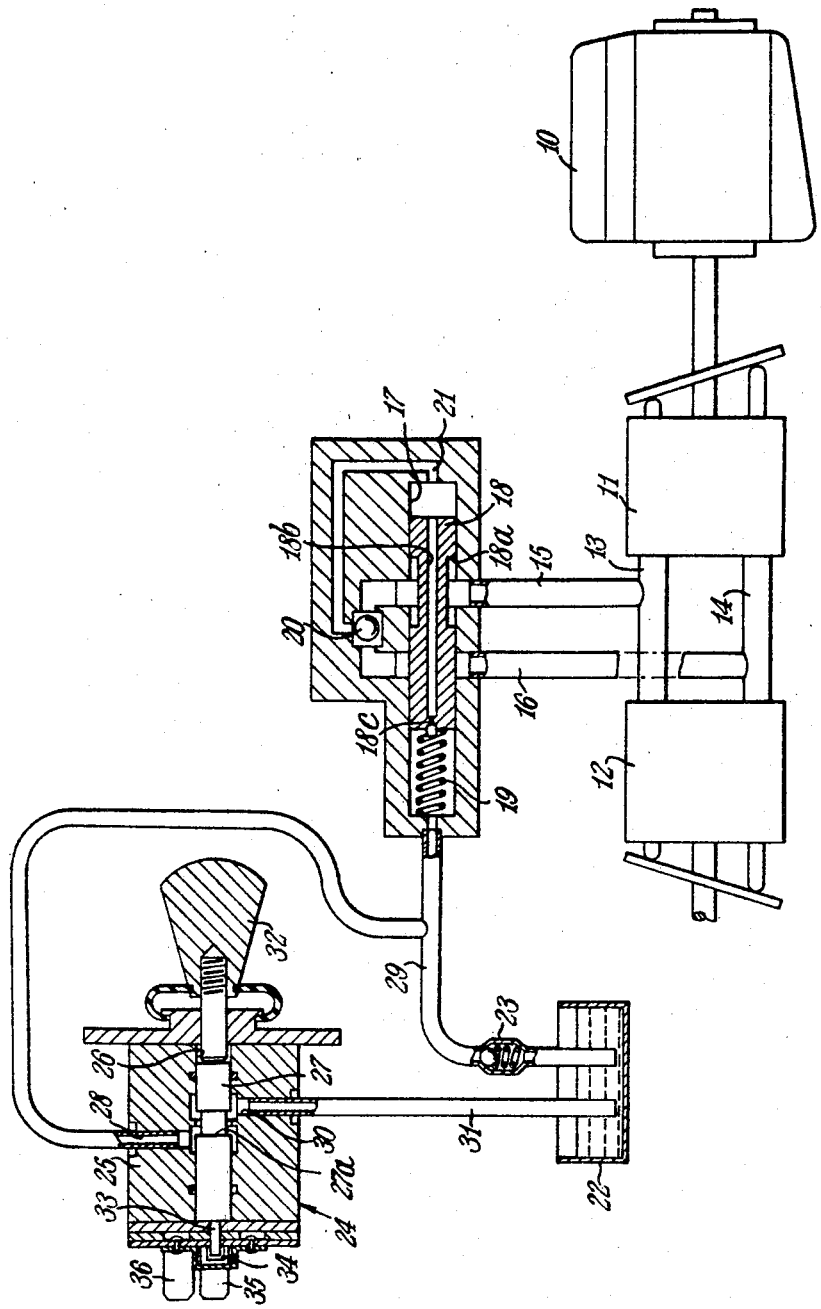

3,399,531
HYDRAULIC TRANSMISSION SYSTEMS
John Thomas Matthew Wright, Southport, England, assignor to Joseph Lucas (Industries) Limited, Birmingham, England
Filed July 11, 1966, Ser. No. 564,106
3 Claims. (Cl. 60—53)

ABSTRACT OF THE DISCLOSURE

An hydraulic transmission system comprising a swash plate type pump and a swash type plate motor arranged to be driven thereby, ducts extending between the pump and motor, a spring loaded control valve which can be urged against the spring by the application of fluid under pressure to a position in which the ducts between the pump and motor are in communication with one another and a manual valve which in one position permits the escape of fluid from one end of the control valve to permit it to move against the action of its spring, the manual valve also incorporating an electrical switch arranged in use in a circuit including the electric starter motor of a prime mover for the transmission system.

---

This invention relates to hydraulic transmission systems of the kind comprising a hydraulic motor, and a pump both of the swash-plate type and the pump being adapted to be driven by a prime mover for supplying motive fluid to the motor, the inlet of the motor being connected to the outlet of the pump, and the outlet of the motor being connected to the inlet of the pump, and the stroke of the pump and/or motor being variable to change the speed ratio between the prime mover and the motor.

The object of the invention is to provide such a system in a convenient form.

According to the invention a hydraulic transmission system of the kind specified comprises, in combination, a member defining a cylinder, a spool valve mounted in the cylinder and movable against a spring to a position to open communication between the inlet and outlet of the pump or motor, a selector valve through which one end of the cylinder is connected to said inlet or said outlet, whichever is at the higher fluid pressure, whereby said higher fluid pressure can act upon the spool valve in opposition to the spring, there being defined a restricted passage through which said one end of the cylinder is in communication with said other end of the cylinder, and a further valve through which fluid can escape from said other end of the cylinder, the arrangement being such that when said further valve is closed, the spring will hold the spool valve in a position to close communication between said inlet and said outlet, but when said further valve is open, the pressure drop across the restricted passage will allow the spool valve to move against the spring to the position to open communication between said inlet and said outlet.

One example of the invention will be described with reference to the single figure of the accompanying drawings which is a partially diagrammatic view of the system.

In this example, a vehicle is provided with an engine 10 driving a pump 11 of the swash-plate type for supplying motive fluid to a hydraulic motor 12 of the swash-plate type for driving the ground wheels or tracks of the vehicle. The obliquity of the swash-plate of the pump and/or motor can be adjusted to vary the speed ratio between the engine and vehicle wheels, and the inlet of the pump is connected to the outlet of the motor to provide a substantially closed circuit for the fluid, through ducts 13 and 14.

The inlet port and outlet port of the pump are both in communication (as indicated by ducts 15 and 16) with a cylindrical chamber 17 formed in the pump body the ducts 15 and 16 joining the chamber 17 at axially spaced positions. Moreover, in the chamber 17 is a cylindrical spool valve 18 which is loaded by a spring 19 to a position to interrupt communication between the ducts 15 and 16, but which is movable axially against the spring 19 to a position in which communication between the ducts is established through a circumferential recess 18a in the spool 18. Furthermore, the spool has an axial passage 18b extending from end to end, and incorporating a restriction 18c.

The end of the chamber 17 towards which the spool is spring-loaded, is connected to the ducts 15 and 16 through the passage 21 through a selector valve 20. The selector valve which may be of known form, permits the higher of the pressures in the two ducts to be applied to the spool 18, whilst preventing flow to the duct at lower pressure. This is necessary since it will be understood that on "overrun" the motor 12 will tend to drive the pump 11. Moreover, in reverse drive, the inlet of the pump becomes the outlet and vice versa.

The other end of the chamber 17 is connected to a "make up" reservoir 22 through a spring-loaded relief valve 23, and a manually operable valve 24 (which is shown enlarged in the drawing) arranged in parallel. The relief valve 23 is arranged to open automatically when the pressure in the system exceeds a predetermined value, and the manually operable valve 24 is intended to be opened whenever the vehicle is at rest, and in this case has an associated switch arranged to open when the valve is closed.

The manually operable valve 24 comprises a body 25 having a cylindrical bore 26 in which is slidably mounted a spool 27. The spool is capable of being positioned so that a recess 27a thereon affords a communication between an inlet 28, connected to the cylinder 17 through the pipe 29, and an outlet 30, connected to the reservoir through the pipe 31. A further position of the spool 27 prevents this communication. To move the spool there is a control knob 32 connected to the spool 27. At the opposite end of the spool 27 from the knob 32 is a switch operating rod 33. This is arranged to engage a resilient contact member 34 which is arranged to bridge a pair of contacts 35, 36 when the valve is open and breaks electrical contact when the valve is closed. The switch is connected in series with a starter motor circuit so that the starter motor cannot be operated with the manually operable valve 24 closed.

When both the relief valve 23 and the manually operable valve 24 are closed the spring 19 holds the spool 18 in a position to interrupt communication between the ducts, and the transmission system can operate in the normal manner. However, if either the relief valve 23, or the manually operable valve 24 is open, the pressure drop across the restriction 18c in the spool 18 will result in the latter moving to a position to establish communication between the ducts 15 and 16 and thus between the ducts 13 and 14, and thereby prevent transmission of torque from the engine to the vehicle wheels or vice versa.

A system as above described is particularly desirable for use on tractor vehicles incorporating a "power take off," since with the manually operable valve 24 open it is impossible to move the vehicle even though the speed ratio control is accidentally moved when the tractor is being used to drive stationary machines.

It will be understood that, if desired, the valves, could be associated with the motor instead of, or in addition to the pump.

Having thus described my invention what I claim as new and desire to secure by Letters Patent is:

1. An hydraulic transmission system comprising an hydraulic swash plate type pump, an hydraulic swash plate type motor arranged to be driven by the pump, ducts connecting the pump outlet with the motor inlet and the pump inlet with the motor outlet respectively, a member defining a cylinder, a spool valve mounted in the cylinder, a spring acting against one end of the spool valve, passage means in the member affording communication between the ducts of the pump and motor when the spool valve is moved to a position against the action of the spring, a selector valve through which one end of the cylinder at the end of spool valve remote from the spring, is connected to whichever of the ducts is, in use, at a higher pressure, passage means whereby fluid under pressure is applied to the end of the cylinder at which the spring acts on the spool valve, a further valve in communication with said passage means, said further valve in one position permitting escape of fluid under pressure from said passage means to permit the spool valve to move against the action of the spring, and in a second position preventing such escape, and an electrical switch operatively connected to the further valve, said switch being, in use, connected in an electrical circuit which, when the valve is in said second position, preventing escape of fluid, prevents operation of a starter motor for a prime mover arranged to drive the transmission system.

2. An hydraulic transmission system as claimed in claim 1 in which the futher valve is a manually operable spool valve and the electrical switch is incorporated therein.

3. An hydraulic transmission system as claimed in claim 1 in which the passage means includes a relief valve arranged to open when pressure therein reaches a predetermined value.

References Cited

UNITED STATES PATENTS

| | | | |
|---|---|---|---|
| 3,143,858 | 8/1964 | Roeske | 60—53 |
| 3,164,960 | 1/1965 | Weisenbach et al. | 60—53 XR |
| 3,243,959 | 4/1966 | Fantom | 60—53 |

EDGAR W. GEOGHEGAN, *Primary Examiner.*